United States Patent
Haase et al.

(10) Patent No.: US 12,391,449 B2
(45) Date of Patent: Aug. 19, 2025

(54) METHOD FOR THE PRODUCTION OF AT LEAST ONE AROMA PROTECTION VALVE, AND AROMA PROTECTION VALVE

(71) Applicant: Syntegon Technology GmbH, Waiblingen (DE)

(72) Inventors: Jenny Haase, Allmersbach (DE); Felix Schmid, Villingen-Schwenningen (DE)

(73) Assignee: Syntegon Technology GmbH, Waiblingen (DE)

( * ) Notice: Subject to any disclaimer, the term of this patent is extended or adjusted under 35 U.S.C. 154(b) by 255 days.

(21) Appl. No.: 18/352,462

(22) Filed: Jul. 14, 2023

(65) Prior Publication Data
US 2024/0017900 A1  Jan. 18, 2024

(30) Foreign Application Priority Data
Jul. 14, 2022 (DE) ...................... 10 2022 117 642.8

(51) Int. Cl.
*B65D 77/00* (2006.01)
*B65D 77/22* (2006.01)

(52) U.S. Cl.
CPC ........ *B65D 77/225* (2013.01); *B65D 2205/00* (2013.01)

(58) Field of Classification Search
None
See application file for complete search history.

(56) References Cited

U.S. PATENT DOCUMENTS

| | | | | |
|---|---|---|---|---|
| 2009/0120949 | A1* | 5/2009 | Mashiko | F16K 15/145 220/745 |
| 2017/0355494 | A1* | 12/2017 | Kalokhe | B65D 47/20 |
| 2020/0010256 | A1* | 1/2020 | Larsson | B65D 51/1644 |
| 2022/0332490 | A1 | 10/2022 | Stadel et al. | |

(Continued)

FOREIGN PATENT DOCUMENTS

| | | | | |
|---|---|---|---|---|
| DE | 3031208 | A1 * | 4/1982 | B65D 77/22 |
| DE | 19721028 | A1 | 11/1998 | |
| DE | 102019214316 | A1 * | 3/2021 | B31B 50/84 |

(Continued)

OTHER PUBLICATIONS

German Patent Office Action for Application No. 102022117642.8 dated Jan. 25, 2023 (8 pages including English translation).

(Continued)

*Primary Examiner* — Yung-Sheng M Tsui
(74) *Attorney, Agent, or Firm* — Michael Best & Friedrich LLP

(57) ABSTRACT

A method for producing at least one, in particular external, aroma protection valve for a packaging container, having a basic element and having a valve membrane which is connected at least in sections to the basic element in a joining process by an energy input, the basic element and the valve membrane being connected to each other without an adhesive in the joining process. The basic element and the valve membrane (14a) are connected at least in sections in the joining process by ultrasonic welding, wherein the basic element and the valve membrane are connected to each other in the joining process on a base element, in particular a film web, which is provided for handling and/or stabilizing the basic element and/or the valve membrane during the joining process.

12 Claims, 5 Drawing Sheets

(56) References Cited

U.S. PATENT DOCUMENTS

2024/0417152 A1* 12/2024 Albino ................. B65D 77/225

FOREIGN PATENT DOCUMENTS

DE      102019214317 A1 *  3/2021  ............. B65D 33/01
WO     WO-2016205408 A1 * 12/2016  ....... B05B 11/00412

OTHER PUBLICATIONS

European Patent Office Extended Search Report for Application No. 23185467.0 dated Dec. 21, 2023 (13 pages including English translation).

European Patent Office Examination Report for Application No. 23185467.0 dated Jun. 4, 2024 (4 pages including English machine translation).

* cited by examiner

METHOD FOR THE PRODUCTION OF AT LEAST ONE AROMA PROTECTION VALVE, AND AROMA PROTECTION VALVE

CROSS REFERENCE TO RELATED APPLICATION

This application is based on and incorporates herein by reference the German patent application 10 2022 117 642.8, which was filed on Jul. 14, 2022.

BACKGROUND

The prior art has already disclosed disposable degassing valves which are produced by laminating various individual materials and are applied in a self-adhesive manner to an outer side of a packaging container. The respective individual materials are connected to one another in the prior art to date by means of the application of an adhesive layer. For example, in the prior art, a basic element of the disposable degassing valve is connected to a valve membrane of the disposable degassing valve via a laminated application of adhesive, also in an adhesively bonding manner. Due to the adhesive layers between the individual materials, the disposable degassing valve contains a high number of foreign materials which make especially a type-specific separation of the individual materials of the disposable degassing valve more difficult when recycling the disposable degassing valve after use and/or usage.

DE 30 31 208 A1 has already disclosed a method for producing at least one aroma protection valve for a packaging container, wherein a basic element and a valve membrane of the aroma protection valve are connected at least in sections in a joining process by means of energy input.

The object of the invention consists in particular in providing a method of the type in question and/or a product of the type in question with improved properties in respect of efficiency in the production of aroma protection valves, a reduction of foreign materials and/or improved recyclability.

SUMMARY

The invention is based on a method for producing at least one, in particular external, aroma protection valve for a packaging container, having at least one basic element and having at least one, in particular flexible, valve membrane which is connected at least in sections to the basic element in a joining process by means of energy input, wherein the basic element and the valve membrane are connected to each other without an adhesive in the joining process.

It is proposed that the basic element and the valve membrane are connected at least in sections in the joining process by means of ultrasonic welding, wherein the basic element and the valve membrane are connected to each other in the joining process on a base element, in particular a film web, which is provided for handling and/or stabilizing the basic element and/or the valve membrane during the joining process.

Such a production method makes it possible to reduce, and preferably prevent, portions of foreign materials in at least one aroma protection valve. Therefore, a varietal purity of the aroma protection valve can be optimized and a more long-lasting aroma protection valve provided and/or produced. Furthermore, recyclability of the aroma protection valve and/or of a packaging container, on which the produced aroma protection valve can be and/or have been arranged, can be improved. In addition, food conformity, joining quality, seal tightness, service life, durability and/or more flexible usability of the aroma protection valve can be increased. Moreover, the production method can be configured to be more efficient, for example more rapid, more comfortable and/or so as to reduce the outlay. Furthermore, cost efficiency and/or product efficiency and/or working efficiency can be increased since, in a joining process using the energy input, additional connecting pieces/connecting elements, for example adhesives, for joining a basic element and a valve membrane of the aroma protection valve can be dispensed with.

Furthermore, the present invention is based on an aroma protection valve, in particular an external aroma protection valve, for a packaging container, which is at least partially produced by the aforementioned method, the basic element and the valve membrane being connected to each other without an adhesive. It is proposed that the basic element and the valve membrane were connected to each other in a joining process on a base element, in particular a film web, that is removable for an application process in which the aroma protection valve can be arranged on the packaging container. In particular, the aroma protection valve is provided to ensure pressure equalization in the packaging container and advantageously to protect the packaging container against bursting and/or disintegrating and to obtain aromatic substances contained in the packaging container on the basis of at least one filling material. In particular, the packaging container is provided to package the filling material, specifically to at least partially and preferably completely receive, store and/or enclose the filling material. The filling material arranged in the packaging container may output gases, specifically aromatic gases. For example, if the filling material is coffee beans, when the coffee beans are packaged after a roasting operation, gases, at least partially and advantageously mostly consisting of carbon dioxide, may escape from the coffee beans. The coffee beans may continuously output gases even after several weeks. The gas can spread in the packaging container and, over increasing time, generate a rising pressure which presses against an inner wall of the packaging container. If the pressure is excessive, a failure may possibly occur, specifically disintegration and/or bursting of the packaging container. Pressure equalization can be achieved in the packaging container by means of the aroma protection valve, specifically by the gas being able to escape through the aroma protection valve.

The aroma protection valve can enable the discharge of gases in a direction of movement, specifically preferably from an interior of the packaging container, in which the filling material is arranged, into surroundings of the packaging container. The aroma protection valve is advantageously provided for a constant escape of gases. Furthermore, the aroma protection valve can prevent an ingress of gases, for example oxygen, from the surroundings of the packaging container into the interior of the packaging container in order preferably to ensure aroma protection for the filling material. Advantageously, at least one vent opening of the aroma protection valve is opened for the escape of gases if an, in particular predefined setpoint pressure difference between a pressure in the interior of the packaging container and a pressure in the surroundings of the packaging container is achieved. Alternatively and/or additionally, at least the vent opening of the aroma protection valve can be opened if the pressure in the interior increases above atmospheric pressure and therefore releases the adhesive and cohesive forces so as to allow gas to escape via at least the vent opening. An opening pressure for opening the vent opening can be, for example, at least 2 mbar, advantageously at least 5 mbar, preferably at least 7 mbar and particularly preferably at least 20 mbar. If the pressure difference drops to a defined, in particular predefined, setpoint value, the aroma protection valve can close again, preferably can close in an air-tight manner, and thus prevent gases from emerging from the interior and/or gases from entering from the surroundings of the packaging container. As a result, in addition to preventing disintegration of the packaging container, flattening and/or inflating of the packaging container can also be prevented. A closing pressure for closing the vent opening can be, for example, at least 0.5 mbar, advantageously at least 1 mbar, preferably at least 2 mbar and particularly preferably at least 10 mbar. In particular, the opening pressure and the closing pressure are coupled to each other and/or are operatively connected to each other.

The aroma protection valve can be an internal and preferably external aroma protection valve. The internal aroma protection valve can be at least partially and advantageously completely integrated and/or arranged in at least one packaging container side wall consisting of a packaging material. The internal aroma protection valve can already be produced at the same time as the packaging container is produced. The side wall can be, for example, a top wall, bottom wall or a wall on another side of the packaging container. The external aroma protection valve is preferably formed and/or produced and/or can be produced independently of the packaging container, in particular in a separate production process from the packaging container. The external aroma protection valve can be connected to, and/or arranged on, the packaging container, in particular at least the side wall, preferably an outer wall, of the packaging container, retrospectively, specifically after separate production of the packaging container and of the aroma protection valve.

The external aroma protection valve preferably has an, in particular self-adhesive, adhesive surface for attaching to and/or arranging on the packaging container, advantageously to/on at least the side wall of the packaging container. The adhesive surface can be part of the basic element. Preferably, a bottom side of the basic element, specifically a side of the basic element which, in particular in a connected state, faces away from the valve membrane, at least partially has the adhesive surface. In particular, the basic element and the in particular flexible valve membrane are part of the aroma protection valve and form a subassembly of the aroma protection valve. In addition, the aroma protection valve can have further elements and/or units. However, it would also be conceivable for the basic element and the valve membrane to form the entire aroma protection valve.

In the joining process, the basic element and the valve membrane are connected to each other at least in sections, specifically by means of energy input. The energy input can take place directly or indirectly. The energy input in the joining process advantageously involves energy generated externally from the outside, specifically by means of an energy source, and introduced to the basic element and/or the valve membrane. The energy input preferably takes place locally, specifically focused on and/or in, in particular predefined, regions and/or sections of the basic element and/or of the valve membrane. In particular, in the joining process, energy is introduced and/or transmitted to and/or in at least one region and/or at least one portion of the basic element and/or of the valve membrane. Energy can be input punctiformly at the basic element and/or the valve membrane by means of the energy source. The energy input can involve, for example, heating, in particular local heating, of at least one region and/or at least one portion of the basic element and/or of the valve membrane. For example, at least the region and/or at least the portion of the basic element and/or of the valve membrane can be heated in the joining process. Alternatively and/or additionally, energy can also be input at devices and/or components used in the joining process. After the joining process, in particular in the connected state, the basic element and the valve membrane advantageously each have a connected portion and an unconnected portion. However, it would also be conceivable for the basic element and the valve membrane to be completely connected to each other, in particular over the full surface area, in the joining process.

The unconnected portion of the basic element and of the valve membrane is advantageously provided to allow gases to escape from the interior as the pressure in the interior of the packaging container increases. The unconnected portion can be part of the aforementioned vent opening or can form the latter. The valve membrane is preferably configured flexibly in order to permit gas to escape from the interior of the packaging container. The valve membrane preferably expands as the pressure in the interior increases and, in the unconnected portion, can at least partially form an opening passage of the vent opening for gases to escape from the interior. If the pressure in the interior drops again, the expansion of the valve membrane shrinks, as a result of which the opening passage closes again. The opening passage can be at least partially delimited and/or formed by the basic element and at least the valve membrane.

In the connected state, a fluid sealing medium, for example oil, can be arranged between the basic element and the valve membrane at least in sections, in particular in at least the unconnected portion. The sealing medium can spread between the basic element and the valve membrane and form a gas-tight barrier. In particular, the sealing medium is provided for sealing at least the unconnected portion of the basic element and of the valve membrane. The sealing medium is preferably introduced and/or applied in a separate process after at least the aforementioned joining process, specifically at least after connection of the basic element to the valve membrane, in particular in at least the unconnected portion between the basic element and the valve membrane. The sealing medium is advantageously introduced and/or applied on a bottom side of the valve membrane, specifically a side of the valve membrane facing the basic element. Alternatively and/or additionally, the sealing medium can be introduced and/or applied on an upper side of the basic element, specifically a side of the basic element facing the valve membrane.

If the pressure prevailing in the interior overcomes the adhesive forces of the sealing medium to the valve membrane, the cohesive forces of the fluid film and/or exceeds the atmospheric pressure in the surroundings of the packaging container, the valve membrane, in particular in the unconnected portion, may lift up and/or arch at least partially and/or at least in sections in order to form the vent opening, specifically at least the opening passage for the escape of the gases. The sealing medium is advantageously pressed and/or forced here against the respective side walls of the valve membrane within the opening passage in order thus to permit the escape of the gases. The gases can escape from the interior until the pressure difference between the interior and the surroundings of the packaging container has dropped to a certain, in particular predefined, setpoint value, with the vent opening subsequently closing again, specifically sealing the valve membrane again gas-tightly to the basic element by means of the sealing medium. Particularly preferably, the sealing medium is provided to prevent gases from the surroundings, for example oxygen, from entering in a closed state of the vent opening, in particular of the opening passage, and in an open state of the vent opening, in particular of the opening passage.

"Provided" is intended to be understood here and below as meaning specially programmed, configured and/or equipped. The fact that an object is provided for a certain function is intended to be understood as meaning that the object meets and/or carries out this certain function in at least one use and/or operating state.

Owing to the fact that the basic element and the valve membrane are connected to each other without an adhesive in the joining process, the reduction or avoiding of foreign materials can be made possible specifically by replacing, specifically avoiding, an adhesive bond. Therefore, a particularly type-specific and readily recyclable, and also durable aroma protection valve can be produced and/or provided.

The connection of the basic element and the valve membrane at least in sections advantageously takes place avoiding an adhesive or adhesives, in particular an adhesive tape or adhesive tapes. An "adhesive" is intended to be understood as meaning a substance and/or element which is provided to enter into an integrally bonded connection with at least one object. The adhesive is preferably a non-metallic substance which is provided to connect at least two elements by surface adhesion and its internal strength.

Furthermore, it is proposed that the basic element and the valve membrane are connected to each other in a continuous joining process. This can permit a particularly efficient production method and advantageously a multiplicity of aroma protection valves can be produced efficiently, specifically rapidly, comfortably and/or in an uncomplicated manner. Cost efficiency and/or product efficiency and/or working efficiency can therefore be further increased.

The continuous joining process is intended to be understood as meaning the aforementioned joining process which preferably takes place continuously. At least the aroma protection valve can be arranged on the base element, in particular the film web, and in particular can be manufactured and/or produced and/or stored on reels. The bottom side of the basic element, in particular the side of the basic element facing away from the valve membrane, is preferably connected to the base element, in particular the film web, and/or arranged on the base element, in particular the film web. The adhesive surface can be connected to the base element, in particular the film web. The basic element, in particular the bottom side of the basic element, can be connected to the base element, in particular the film web, by means of the adhesive surface. According to the invention, the base element, in particular the film web, is provided for improved handling and/or stabilization of the basic element and/or of the valve membrane during the joining process and/or for efficient, for example rapid and/or continuous, production.

It would be conceivable for the basic element to be connected to the base element without an adhesive. Alternatively, the basic element can be connected at least in sections to the base element by means of an adhesive to fix it on the base element. The base element can be stiff and preferably flexible and/or elastic. The base element can be repeatedly deformable without the base element thereby being mechanically damaged or destroyed, with the base element, in particular after deformation, automatically endeavoring to return again into a base shape. In particular, the base element is pliable. In an application process, at least the aroma protection valve can preferably be arranged, in particular can be adhesively bonded, on the packaging container. In the application process, the aroma protection valve can be adhesively bonded on the packaging container by means of the adhesive surface. In particular, the application process takes place in respect of a time profile after at least the joining process.

The method preferably comprises producing a multiplicity of aroma protection valves, in particular external aroma protection valves. The multiplicity of aroma protection valves can be arranged on the base element, advantageously on the film web, in particular next to one another, for example in a row one behind another. The multiplicity of aroma protection valves can be manufactured on reels. Advantageously, in the continuous joining process, the multiplicity of aroma protection valves are produced one after another. In the joining process, the base element, a multiplicity of basic elements, in particular a basic element web, and a multiplicity of valve membranes, in particular a valve membrane web, could be guided and/or conducted continuously through at least one machine and/or a unit which is provided for producing the aroma protection valves, specifically at least for connecting the basic elements to the valve membranes. The basic elements are advantageously already pre-punched and/or pre-cut and in particular arranged individually on the base element. Additionally, the valve membranes could be pre-punched and/or pre-cut and in particular at least partially arranged individually on the basic elements. This preferably involves a valve membrane web which is at least partially arranged on the basic elements and/or at least partially on the base element and, in the joining process, in particular in the continuous joining process, is connected to the basic element and in particular additionally at least in sections to the base element, advantageously in each case between at least two basic elements.

In the application process, the aroma protection valves could be adhesively bonded by means of their adhesive surface to the packaging container. The aroma protection valves can be removed from the base element in the application process. After at least the joining process and before the application process, the aroma protection valves could in each case be punched out and/or cut out in a cutting process in order to be able to be connected in particular individually to one packaging container each.

In addition, it is proposed that the basic element and the valve membrane are connected to each other along at least one joining seam in the joining process. Joining of a basic element and a valve membrane of an aroma protection valve can therefore be optimized, specifically configured more efficiently. In addition, seal tightness and/or joining strength, consequently a durability of the aroma protection valve, can be increased and/or extended.

In particular, the joining seam is arranged in the connected portion or forms the latter. According to the invention, the basic element and the valve membrane are connected to each other on the base element in the joining process, with the joining seam advantageously only connecting the basic element and the valve membrane to each other. The joining seam is advantageously at least a result of the energy input in the joining process. The basic element and the valve membrane can be connected to each other in an integrally bonded manner in the joining process in and/or by means of the joining seam. Preferably, the basic element and the valve membrane are connected to each other in an integrally bonded manner after the joining process in and/or by means of the joining seam. The joining seam can extend at least in sections along a longitudinal extent of the base element, in particular of the film web. Advantageously, the joining seam extends over an entire longitudinal extent of the base element. The joining seam can be arranged at least substantially parallel to at least one edge of the base element, advantageously at least one longitudinal edge of the base element. "Substantially parallel" is intended to be understood here as meaning an alignment of a direction relative to a reference direction, in particular in a plane, the direction having a deviation of less than 8°, advantageously less than 5° and particularly advantageously less than 2°, in relation to the reference direction. Furthermore, it is intended to be understood by this that the direction is oriented and/or arranged parallel to the reference direction, specifically apart from manufacturing tolerances and/or within the scope of standardized tolerances.

In the continuous joining process, the joining seam can preferably be produced continuously along the entire longitudinal extent of the base element, in particular of the film web. When the multiplicity of aroma protection valves are produced, the basic elements and the valve membranes, in particular the valve membrane web, can be connected to one another continuously along the joining seam. In particular, the joining seam extends at least in sections along a longitudinal extent of the valve membranes, in particular of the valve membrane web, and advantageously completely over an entire longitudinal extent of the valve membranes, in particular the valve membrane web. At least one edge, in particular a longitudinal edge, of the valve membranes, in particular of the valve membrane web, is preferably arranged at least substantially parallel to at least the longitudinal edge of the base element. The joining seam can have a width extent of, for example, at least 0.2 mm, advantageously at least 0.5 mm, preferably at least 1 mm and preferably of at most 5 mm and particularly preferably at most 3 mm.

A "longitudinal extent" of an object is intended to be understood in this connection as meaning an extent of the object in a direction of longitudinal extent of the object. The "direction of longitudinal extent" of the object is a direction which is oriented parallel to a longest edge and/or side of a smallest, in particular imaginary, cuboid just surrounding the object. Furthermore, a "width extent" of an object is intended to be understood in this connection as meaning an extent of the object in a direction of width extent of the object. The "width direction of extent" of the object is a direction which is oriented parallel to a second longest edge and/or side of an, in particular the aforementioned, smallest, in particular imaginary, cuboid just surrounding the object.

If the basic element has at least one opening and, in the joining process, the basic element and the valve membrane are connected to each other along at least two joining seams on opposite sides of the opening, a seal tightness and/or joining strength, consequently durability of an aroma protection valve can be extended and/or further increased. In addition, an efficient production method can be provided.

The two aforementioned joining seams are preferably formed and/or produced identically to each other, and therefore a description of the joining seam already mentioned can be transferred to all other joining seams. In this connection, the wording "identical objects" means objects which advantageously have the same structure and/or shape and/or outer contour and/or design and/or configuration and/or at least largely and preferably completely have the same material composition, but may at least partially differ in respect of their functionality, their inner construction, their arrangement on another object and/or their orientation with respect to another object. Preferably, however, the identical objects are identical apart from manufacturing tolerances and/or in the range of standardized tolerances.

Particularly preferably, the two joining seams are oriented and/or arranged at least substantially parallel to each other. The joining seams could each be at a different distance from the opening of the basic element. Furthermore, the joining seams could be among one another at the same distance from the opening and/or could each be arranged at a same distance from the opening. The joining seams are advantageously spaced apart identically from the opening. The distance between the opening, specifically an edge, in particular an outer edge, of the opening and at least one of the joining seams, preferably both of the joining seams, can be at least 1 mm, advantageously at least 3 mm, preferably at least 5 mm and in particular at most 20 mm and particularly preferably at most 10 mm. Furthermore, a distance between the two joining seams could be at least 5 mm, advantageously at least 10 mm, preferably at least 15 mm and particularly preferably at most 20 mm.

In particular, the opening is part of the vent opening. The air flowing out of the interior of the packaging container, in particular if the aroma protection valve is arranged on the packaging container, can press through the opening of the basic element against at least the valve membrane, in particular until the latter is deformed and/or lifts and the opening pressure is of a sufficient magnitude to completely open the vent opening. It would also be conceivable for the basic element to have a plurality of, in particular small, openings. A configuration of the opening, specifically the opening geometry, in particular a size and/or shape and/or position, can be dependent on the material used for the basic element and the properties thereof and/or on the use and/or arrangement on certain packaging containers and/or on the use with different filling materials. Preferably, the opening is designed in such a manner that there is a uniform and/or reversible and/or reproducible opening and closing ratio, in particular an opening and/or closing pressure. In a top view, the opening could have a round and/or polygonal shape at least in sections. For example, in the top view, the opening could have a circular or a clover leaf shape, in particular three-leaved or four-leaved clover leaf shape. It would also be conceivable for the shape of the opening in the top view to resemble a horizontal eight. In particular, the opening and closing pressure behavior, in particular the opening and closing pressure, can be influenced by changing and/or configuring the opening in some other manner, specifically the opening geometry of the opening.

Furthermore, the basic element in a top view could have a polygonal or round shape and/or outer contour. Advantageously, the basic element in the top view has a square shape, with the corners of the square preferably each being rounded. The basic element could have a length extent differing in length with respect to a width extent. Alternatively, specifically preferably, the basic element has longitudinal and width extents of identical length to one another. The longitudinal and/or width extents could be at least 10 mm, advantageously at least 20 mm and particularly preferably at least 30 mm. A thickness and/or material strength of the basic element could be at least 20 µm, advantageously at least 0.1 mm, preferably at least 0.5 mm, in particular at most 1 mm and particularly preferably at most 0.8 mm. A thickness and/or material thickness of the valve membrane could be at least 10 µm, advantageously at least 50 µm, preferably at least 0.3 mm, in particular at most 1 mm and particularly preferably at most 0.8 mm.

In order to permit a particularly good and stable joining and/or connection of at least one basic element and a valve membrane and therefore to further increase efficiency in respect of a method for producing an aroma protection valve, it is proposed that the basic element and/or the valve membrane are/is heated in the joining process. In particular, the basic element and/or the valve membrane are/is heated by means of the energy input in the joining process. The connection, specifically the joining of the basic element and the valve membrane, can be realized by direct or indirect, in particular oblique or immediate, input of heat. Preferably, the basic element and/or the valve membrane are/is heated locally. The basic element and/or the valve membrane could be heated merely locally in the region of at least one of the joining seams, in particular in each case in the region of both joining seams, specifically preferably briefly, for example for at most 5 s, advantageously for at most 3 s and particularly advantageously for at most 1 s. It would also be conceivable for the base element to be additionally heated at least in sections in the joining process.

The basic element and the valve membrane could be connected to each other in an integrally bonded manner in the joining process for example by means of welding and/or sealing and/or fusing and/or another process/method appearing expedient to a person skilled in the art. The basic element and the valve membrane are preferably connected to each other permanently, specifically nonseperably, in the joining process, with the basic element and the valve membrane being able to be separated from each other again in particular only by being at least partially destroyed.

It would be conceivable for the basic element and the valve membrane to be connected at least in sections to each other in the joining process by means of laser beam welding and/or by means of indirect heating element welding and/or friction welding and/or vibration welding and/or high frequency welding. In a preferred configuration according to the invention of the invention, the basic element and the valve membrane are connected at least in sections in the joining process by means of ultrasonic welding. As a result, a high degree of efficiency in the production of aroma protection valves can be achieved. In addition, at least one neat and/or stable joining seam can be produced without further additional substances and/or connecting materials. Recyclability of the aroma protection valve can therefore in turn be improved.

The ultrasonic welding is preferably used in the joining process if the basic element and/or the valve membrane are/is formed from mono-materials, for example mono-polyethylene, or mono-polypropylene. In particular, during the ultrasonic welding, the basic element and the valve membrane are heated under the action of mechanical energy of a high-frequency sound and joined by fusing of their material. The heating can be produced by the molecules which are set in motion. At least one of the joining seams, in particular both joining seams, can be produced and/or made in the joining process by pressing an ultrasonic sonotrode onto an anvil which is arranged below the ultrasonic sonotrode, as viewed in the vertical direction. It would be conceivable for the ultrasonic sonotrode and/or the anvil to be arranged vertically, preferably free from rolling movements, and used vertically in the joining process. The ultrasonic sonotrode could move in a cycled manner up and down in the vertical direction relative to the anvil.

In order further to increase efficiency in the production of an aroma protection valve and to realize a continuous joining process, it is proposed that the basic element and the valve membrane are connected at least in sections in the joining process by means of ultrasonic roll seam welding. Therefore, in addition to clocked ultrasonic welding, ultrasonic roll seam welding can also be provided for the joining and thus a particularly efficient, continuous joining process provided and/or made possible, with it being possible to dispense specifically with process-interfering cycle pauses. Furthermore, production times and/or an outlay on production can be reduced.

Preferably, the ultrasonic sonotrode and/or the anvil are/is arranged in a rolling manner and/or provided to carry out at least one rolling movement in at least the joining process. Possibly, either the anvil or the ultrasonic sonotrode could be arranged in a rolling manner and/or could execute a rolling movement in the joining process, with in each case the other object, specifically the anvil or the ultrasonic sonotrode, being able to be arranged vertically. Particularly preferably, both the anvil and the ultrasonic sonotrode are arranged in a rolling manner. Advantageously, the ultrasonic sonotrode can also be referred to as a rolling sonotrode, roll seam sonotrode and/or rotational sonotrode. The ultrasonic sonotrode could rotate, for example, counterclockwise and the anvil in the clockwise direction, or the other way around.

Furthermore, it would also be conceivable for the basic element and the valve membrane to be connected at least in sections to each other in the joining process by means of sealing. The sealing could be used in the joining process if the basic element and/or the valve membrane consist/consists of multi-layered films and/or a composite material. Furthermore, the sealing can additionally be used, in particular analogously to the welding, if the basic element and/or the valve membrane are/is formed from mono-materials, for example mono-polyethylene or mono-polypropylene. The sealing could be, for example, sealing via induction and/or Wattron sealing.

In an alternative or additional configuration, it is conceivable for the basic element and the valve membrane to be connected at least in sections in the joining process by means of heat contact sealing. A particularly strong joining and/or connection of a basic element and a valve membrane can therefore be produced and/or provided. By this means, in turn, durability and/or flexibility in usability of an aroma protection valve can be increased. In addition, a particularly efficient production method can be provided.

Advantageously, in the heat contact sealing in the joining process, at least one heated sealing jaw and preferably two heated sealing jaws can be compressed with in particular a predefined pressure and/or a predefined sealing time, with the material to be sealed, specifically the basic element and at least the valve membrane, being arranged between the sealing jaws. The heat contact sealing can be cycled, the cycle being determined or calculated preferably via a melting point of the material from which the basic element and/or the valve membrane are/is formed. The sealing jaws can have shaping and/or configurations. The shaping and/or configuration of the sealing jaws can preferably influence and/or adjust and/or produce and/or select an intermolecular connection and/or joining of the basic element and the valve membrane with desired properties in the region of the shape, rigidity, sealing seam strength and/or seal tightness. During heat contact sealing, the energy input, specifically the heat input, can take place from the outside, preferably from at least one of the sealing jaws. In particular, the heated sealing jaws are arranged on opposite sides of the basic element and the valve membrane and are compressed in the joining process with a contact pressure such that the basic element and the valve membrane are connected, specifically sealed, to each other. The basic element and the valve membrane are advantageously sealed together at at least one sealing point in the joining process. If the contact pressure is released or the contact pressure decreases, a cooling process takes place, in particular as far as room temperature, of the basic element and the valve membrane at the sealing point. Depending on seal tightness requirements of the aroma protection valve, a strength and/or duration of the contact pressure can be varied.

The basic element and at least the valve membrane could be formed from different materials and/or material compositions. Alternatively, specifically preferably, the basic element and at least the valve membrane are formed at least partially, advantageously at least mostly or completely, from the same material and/or the same material composition. As a result, a method for producing at least one aroma protection valve can be further optimized and particularly high varietal purity of the aroma protection valve made possible. A particularly durable aroma protection valve can therefore be provided and/or produced. Furthermore, recyclability of the aroma protection valve can be further improved.

The expression "largely" is intended to be understood here as meaning for example at least 55%, advantageously at least 65%, preferably at least 75%, particularly preferably at least 85% and particularly advantageously at most 95% of a surface portion and/or volumetric portion and/or mass portion. For example, the basic element and/or at least the valve membrane could be at least partially and advantageously at least largely produced and/or formed from renewable raw materials. "Renewable raw materials" are intended to be understood here as meaning organic raw materials, in particular plant raw materials, which originate from agricultural and/or forestry production and are specifically cultivated by humans for further application purposes outside the food and feed industry or which are byproducts and/or waste products from agriculture and/or the food and feed industry. Renewable raw materials within the meaning of the present application are exclusively organic raw materials which are not of fossil origin. Renewable raw materials in this case are preferably domestic products from agricultural and/or forestry production and the byproducts and/or residual substances thereof, unless they are subject to waste legislation, and algae.

Furthermore, the basic element and/or at least the valve membrane could be at least partially and advantageously at least largely formed from a mineral, a metal, plastic and/or a composite material. In order to further optimize and/or provide durability, more flexible usability and/or recyclability of an aroma protection valve, it is proposed that thermoplastic is at least partially used as the basic element. In addition, a method for producing at least one aroma protection valve can be configured more efficiently since a thermoplastic, preferably polypropylene materials, is highly heat-resistant and/or has good mechanical properties, for example of tensile strength and/or elongation at break. In addition, moisture ingress when the aroma protection valve is closed can be prevented by configuring a basic element and preferably a valve membrane from thermoplastic.

The thermoplastic can be, for example, polypropylene (PP), polyethylene (PE), polyvinyl chloride (PVC) or polyethylene terephthalate (PET). The thermoplastic is preferably suitable and/or provided for use in the food industry and for use in food, specifically food packaging. The basic element preferably consists of mono-polypropylene or mono-polyethylene. As a result, a type-specific aroma protection valve can be provided and/or produced. The valve membrane is advantageously additionally formed from thermoplastic. The valve membrane preferably consists of mono-polypropylene or mono-polyethylene. Alternatively and/or additionally, the base element can be formed from thermoplastic.

Particularly preferably, the thermoplastic is an oriented material. The base element and/or the valve membrane could be formed and/or produced for example from at least one biaxially oriented polypropylene film (BOPP).

Furthermore, it is proposed that the basic element and the valve membrane have at least substantially identical expansion properties. As a result, durability, more flexible usability, tensile strength and/or elongation at break of an aroma protection valve can be optimized. In addition, production of the aroma protection valve can be further improved and joining quality of a basic element and a valve membrane increased.

If the basic element and the valve membrane after being joined are guided at least substantially horizontally away from a joining region, joining quality can be further increased and undulations and/or bulging and/or unevennesses in the material, specifically of the basic element and the valve membrane, can be reduced and/or prevented. In addition, imperfections and/or inaccuracies and/or unevennesses in the joining in a joining process can be reduced and/or prevented. By this means, in turn, seal tightness and/or durability of an aroma protection valve can be increased. Furthermore, efficiency in the production at least of the aroma protection valve can be increased.

In particular, the joining region is located between the ultrasonic sonotrode and the anvil and/or between at least the two heated sealing jaws. In this connection, "at least substantially" is intended to be understood as meaning that a deviation from a predefined value and/or an orientation is less than 25%, preferably less than 10% and particularly preferably less than 1% of the predefined value and/or the orientation. It would additionally be possible to influence a joining quality in the joining region by changing and/or adapting guidance of the web from the joining region after the joining.

In addition, it is proposed that at least one functional element of the aroma protection valve, in a further joining process, is connected to the valve membrane on a side of the valve membrane that faces away from the basic element. As a result, seal tightness, service life, durability and/or more flexible usability of an aroma protection valve can be increased. Furthermore, the aroma protection valve can be protected, for example, in a packaging process, a transport process and/or a delivery process and an uncontrolled distortion and/or buckling of the aroma protection valve prevented. In addition, a particularly efficient production method can be provided.

The functional element can be provided to increase and/or to improve strength and/or rigidity of the aroma protection valve. The functional element can be designed as a spacer, in particular spacer strip. In particular, the spacer is provided to protect the valve membrane and/or the basic element, preferably against being crushed and/or disintegrating and/or tearing, for example due to a collision with further packaging containers or other objects. It would be conceivable for the aroma protection valve to have further functional elements which are possibly formed differently or identically to the functional element already mentioned. Advantageously, at least two functional elements are connected to the valve membrane on the side of the valve membrane that faces away from the basic element.

In respect of the time profile, the further joining process can take place after the joining process. Alternatively, however, it would also be conceivable for the further joining process to take place in respect of the time profile before the joining process. The further joining process could differ from the joining process already mentioned. For example, in the further joining process, the functional element could be connected to the valve membrane in an adhesive manner, for example by means of an adhesive film and/or an adhesive strip, specifically could be connected to the valve membrane on the side of the valve membrane that faces away from the basic element. The functional element is preferably connected to the valve membrane by an analogous joining method to how the valve membrane is connected to the basic element. In particular, the further joining process and the joining process are identical in respect of their joining method. The functional element can be connected at least in sections in the further joining process to the valve membrane by means of ultrasonic welding, preferably ultrasonic roll seam welding and/or by means of heat contact sealing.

The aroma protection valve according to the invention and/or the method according to the invention are/is not intended to be restricted here to the above-described application and embodiment. In particular, the aroma protection valve according to the invention and/or the method according to the invention for implementing a mode of functioning described herein can have a different number of individual elements, components and units and also method steps from the number stated herein. In addition, in the case of the value ranges stated in this disclosure, values which lie within said limits are also intended to be considered as disclosed and capable of being used as desired.

BRIEF DESCRIPTION OF THE DRAWINGS

Further advantages emerge from the following description of the drawings. Two exemplary embodiments are illustrated in the drawings. The drawings, the description and the claims contain numerous features in combination. A person skilled in the art will expediently also consider the features individually and combine them to form meaningful further combinations.

In the Drawings.

DETAILED DESCRIPTION

In the following, the figures which are present involve schematic illustrations which are not true to scale. Unless stated otherwise, only one object of objects present in multiple form is provided with a reference sign.

Figure 1:
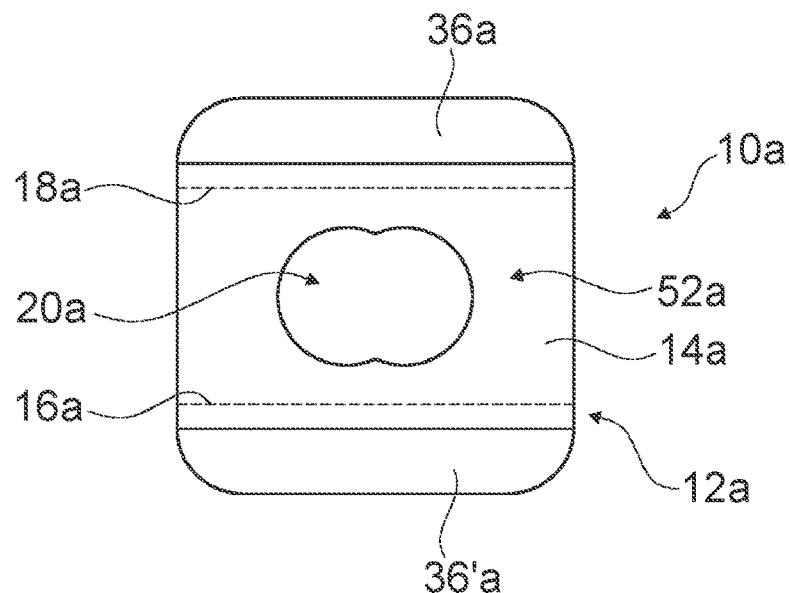
FIG. 1 shows an aroma protection valve according to the invention, which is designed as an external aroma protection valve, after production.
Figure 2:
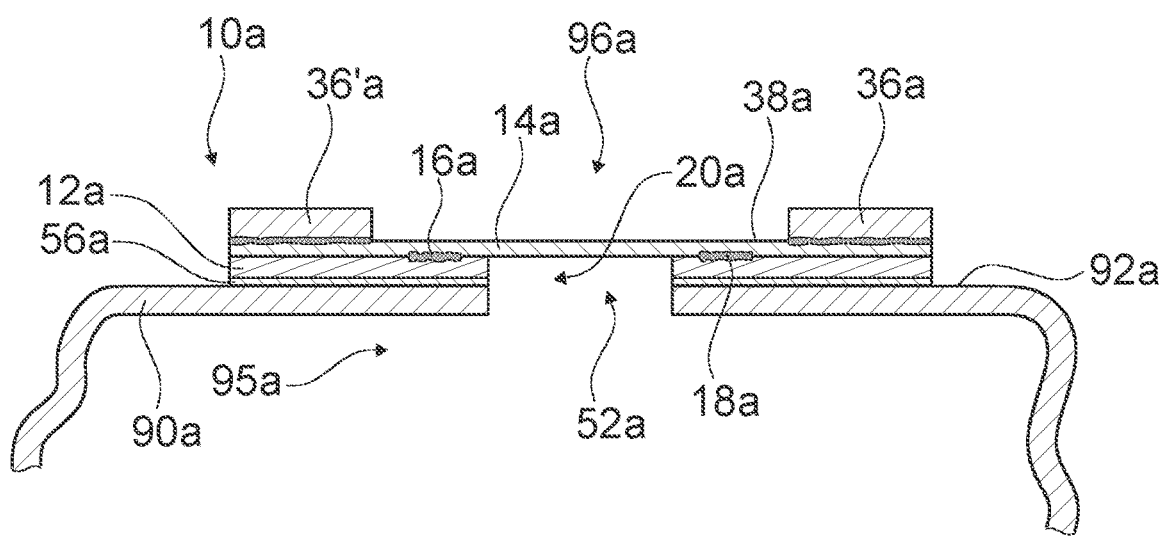
FIG. 2 shows a sectional illustration of the aroma protection valve according to the invention which is arranged in a packaging container, in a closed state of the aroma protection valve.

FIG. 1 shows an aroma protection valve 10a produced for a packaging container which aroma protection valve is designed here as an external aroma protection valve. Alternatively, the aroma protection valve 10a could also be designed as an internal aroma protection valve. The aroma protection valve 10a is provided to ensure pressure equalization in the packaging container 90a and to protect the packaging container 90a against bursting and/or disintegrating and to obtain aroma substances contained in the packaging container on the basis of at least one filling material in the packaging container 90a. The aroma protection valve 10a enables gases to escape in a direction of movement, specifically from an interior 95a of the packaging container 90a, in which the filling material is arranged, into surroundings 96a of the packaging container 90a. Furthermore, the aroma protection valve prevents gases, for example oxygen, from penetrating from the surroundings of the packaging container 90a into the interior 95a of the packaging container 90a in order preferably to ensure aroma protection for the filling material. FIG. 2 shows a sectional illustration of the aroma protection valve 10a, which is arranged on the packaging container in a closed state of the aroma protection valve 10a. In the present case, the aroma protection valve 10a has an adhesive surface 56a and is adhesively bonded to an outer wall 92a of the packaging container 90a.

At least one vent opening 52a of the aroma protection valve 10a is opened for gases to escape if a setpoint pressure difference between a pressure in the interior 95a of the packaging container 90a and a pressure in the surroundings 96a of the packaging container is reached and/or the pressure in the interior 95a of the packaging container 90a increases above atmospheric pressure and therefore releases the adhesive forces and cohesive forces in order to allow gas to escape via at least the vent opening 52a. If the pressure difference drops to a determined, specifically predefined setpoint value, the aroma protection valve 10a can close again, specifically can close in an airtight manner, in order therefore to prevent gases from escaping from the interior 95a and/or gases from the surroundings 96a of the packaging container 90a from entering the interior 95a.

Figure 3:
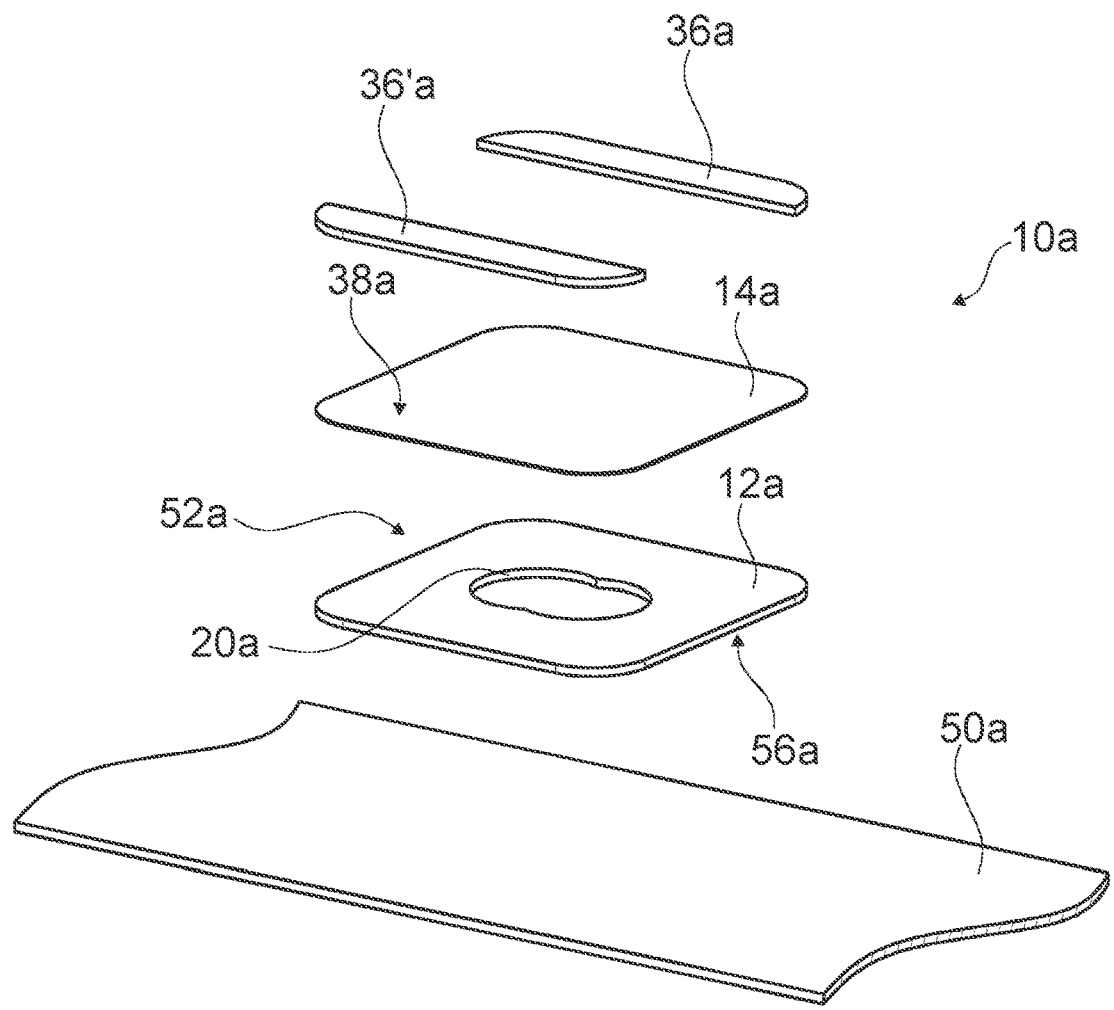
FIG. 3 shows an exploded illustration of the aroma protection valve according to the invention and of a base element on which at least one basic element of the aroma protection valve according to the invention is arranged during the production of the aroma protection valve according to the invention, specifically at least in a joining process for joining/connecting the basic element to a valve membrane of the aroma protection valve according to the invention.
Figure 8:
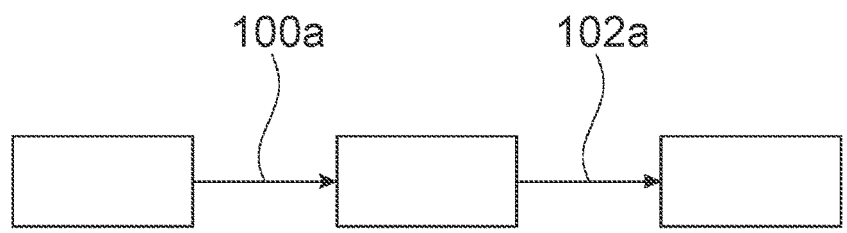
FIG. 8 shows a schematic flow diagram of the method according to the invention for producing at least the aroma protection valve according to the invention.

To clarify a design of the aroma protection valve 10a, an exploded illustration of the aroma protection valve 10a can be seen in FIG. 3. The aroma protection valve 10a has a basic element 12a and a valve membrane 14a. The valve membrane 14a is configured flexibly and pliably. In a method for producing at least the aroma protection valve 10a, the basic element 12a is connected at least in sections in a joining process 100a to the aroma protection valve 10a by means of energy input. FIG. 8 shows a schematic flow diagram of the method for producing the aroma protection valve 10a, which method comprises at least the joining process 100a.

Furthermore, the basic element 12a has at least one opening 20a. The opening 20a is part of the vent opening 52a. If the aroma protection valve 10a is arranged on the packaging container 90a, gases from the interior 95a of the packaging container 90a can press through the opening 20a against the valve membrane 14a, specifically until the latter is deformed and/or lifts and the opening pressure is of a sufficient magnitude to completely open the vent opening 52a so that the gases can escape into the surroundings 96a of the packaging container 90a. An opening and closing pressure behavior of the vent opening 52a, specifically the opening and closing pressure, can be influenced by changing and/or configuring the opening 20a in some other way, specifically an opening geometry of the opening 20a. In a top view, the opening 20a has a round shape at least in sections. For example, in top view, the opening 20a could have a circular or clover leaf shape, for example a three-leaved or four-leaved clover leaf shape. In the present case, the shape of the opening 20a in top view resembles a horizontal eight.

In the present case, use is made of a basic element 12a which is formed at least partially from thermoplastic, specifically from polypropylene (PP) or polyethylene (PE). The basic element 12a and the valve membrane 14a could be formed at least partially or at least mostly from different materials. In the present case, the basic element 12a and the valve membrane 14a are at least partially, specifically at least mostly, formed from the same material and/or the same material composition. In this exemplary configuration, the valve membrane is likewise formed from a thermoplastic, specifically from polypropylene (PP) or polyethylene (PE). In order to increase the degree of recycling and to reduce foreign substance portions, the basic element 12a and/or the valve membrane 14a consist/consists of mono-polypropylene or mono-polyethylene. Furthermore, the basic element 12a and the valve membrane 14a have at least substantially the same expansion properties.

In the method for producing the aroma protection valve 10a, the basic element 12a is arranged on a base element 50a (cf. FIGS. 3 to 6). The base element 50a here is a film web. In a later application process (not illustrated) which, in respect of a time profile, takes place after at least the joining process 100a, the aroma protection valve 10a, specifically the basic element 12a, is separated from the base element 50a and arranged on the packaging container 90a, here adhesively bonded to the packaging container 90a, specifically to the outer wall 92a.

Figure 4:
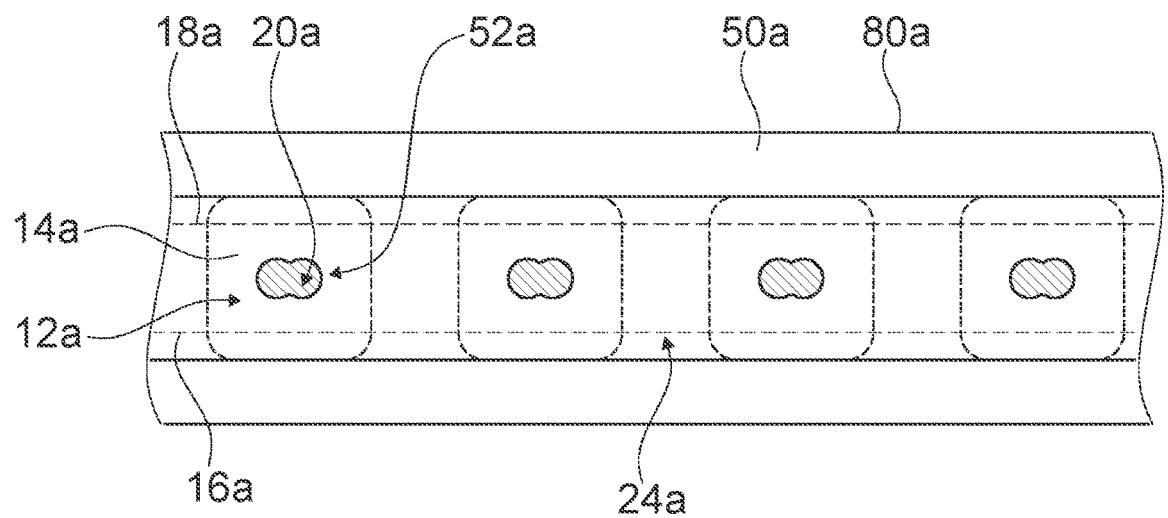
FIG. 4 shows a top view of the base element after the joining process, wherein a multiplicity of basic elements and a valve membrane web covering the basic elements are arranged on the base element.
Figure 5:
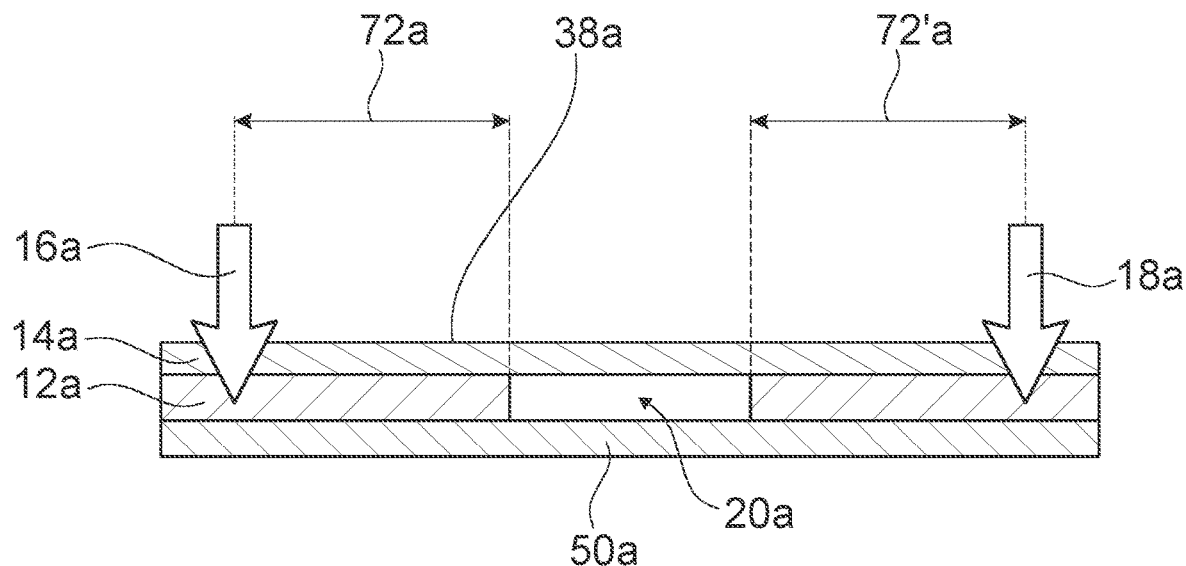
FIG. 5 shows a sectional illustration through the base element, the basic element and the valve membrane before the joining process together with an illustration of an arrangement of joining seams along which the basic element and the valve membrane are connected to each other in the joining process.
Figure 6:
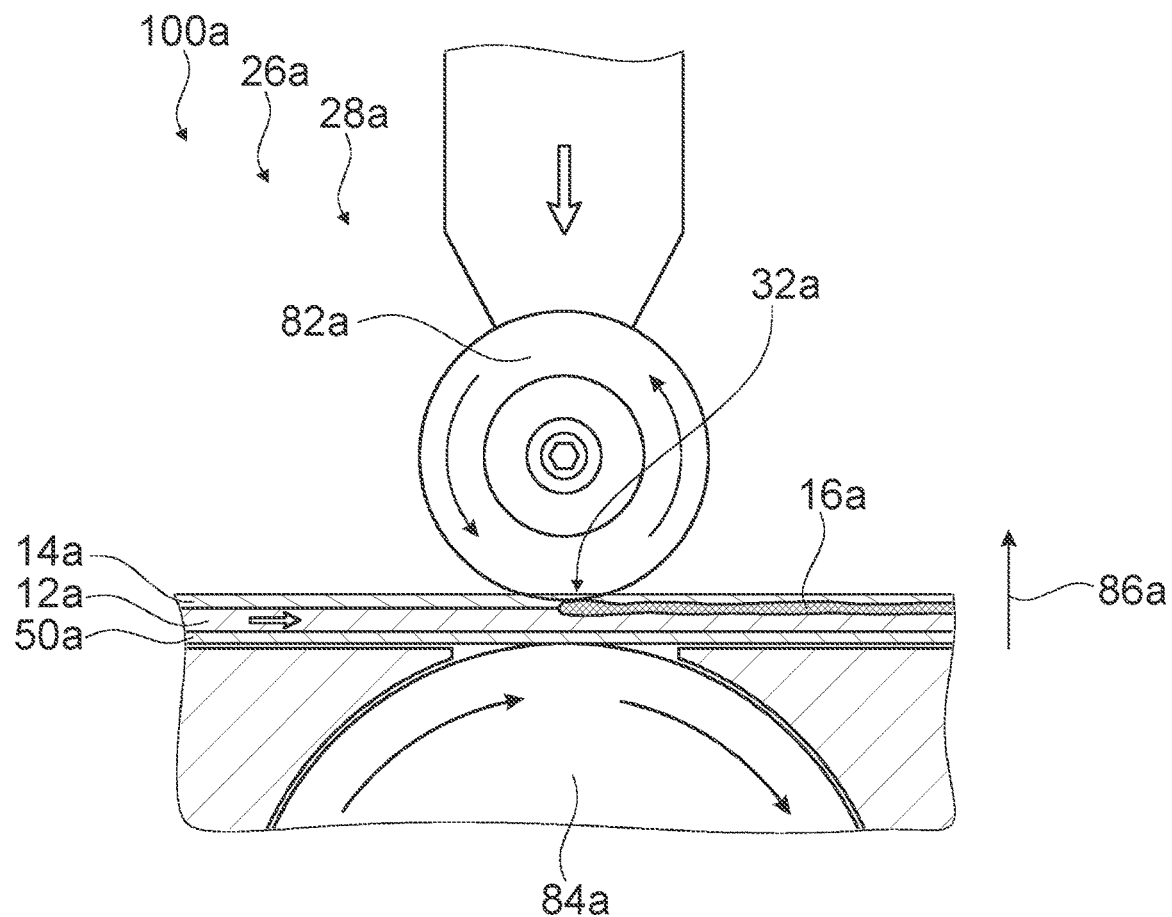
FIG. 6 shows a schematic illustration of the joining process in which the basic element and the valve membrane are connected at least in sections by means of ultrasonic welding.

In this exemplary configuration, the joining process 100a is a continuous joining process. In the joining process 100a, at least the aroma protection valve 10a is manufactured and/or produced on reels. In the present case, a multiplicity of aroma protection valves 10a are produced on the base element 50a in the joining process 100a. FIG. 4 clarifies an arrangement of a multiplicity of basic elements 12a on the base element 50a, with only one of the basic elements 12a being provided with a reference sign. In this exemplary configuration, the basic elements 12a are already pre-punched and/or pre-cut and arranged individually on the base element 50a. Alternatively, it could also be a basic element web. A valve membrane web 24a which forms at least the valve membrane 14a is arranged above the basic elements 12a. Alternatively, a multiplicity of valve membranes 14a could be at least partially arranged individually on and/or above the basic elements 12a. For the sake of simplicity, the production is described below only with reference to an aroma protection valve 10a. In the present case, the multiplicity of aroma protection valves 10a are configured identically to one another, and therefore the descriptions regarding the aroma protection valve 10a can be transferred to all further aroma protection valves 10a of the multiplicity of aroma protection valves 10a.

The basic element 12a and the valve membrane 14a are connected to each other along at least one joining seam 16a in the joining process 100a. The joining seam 16a is at least a result of the energy input in the joining process 100a. In the present case, the basic element 12a and the valve membrane 14a are connected to each other in an integrally bonded manner in and/or by means of the joining seam 16a after the joining process 100a. The joining seam 16a extends at least in sections along a longitudinal extent of the base element Owing to the continuous joining process 100a, the joining seam 16a extends over an entire longitudinal extent of the base element 50a. The joining seam 16a is arranged at least substantially parallel to at least one edge of the base element 50a, specifically at least one longitudinal edge 80a of the base element 50a (cf. FIG. 4).

In the joining process 100a, the basic element 12a and the valve membrane 14a are connected to each other along at least two joining seams 16a, 18a on opposite sides of the opening 20a. The two joining seams 16a, 18a are oriented and/or arranged at least substantially parallel to each other (cf. FIGS. 4 and 5). The joining seams 16a, 18a are among one another at the same distance from the opening 20a and/or are each arranged at the same distance 72a, 72'a from the opening. In the present case, the joining seams 16a, 18a are spaced apart identically from the opening 20a. The distance 72a, 72'a between the opening 20a, specifically an outer edge of the opening 20a, and at least one of the joining seams 16a, 18a is at least 0.5 mm here. In the present case, the two aforementioned joining seams 16a, 18a are formed and/or produced identically to each other, and therefore the description below refers merely to the joining seam 16a, but can be transferred to all other joining seams, specifically at least to the joining seam 18a.

In contrast to previously known methods for producing at least one aroma protection valve 10a, the valve membrane 14 and the basic element 12a are connected to each other without an adhesive in the joining process 100a. In the present case, the at least partial connection and/or joining of the basic element 12a and of the valve membrane 14a takes place avoiding an adhesive or adhesives, for example an adhesive tape or adhesive tapes.

In the joining process 100a, the basic element 12a and/or the valve membrane 14a are/is heated. In the present case, this involves local heating by means of the energy input in the region of the joining seam 16a. In this exemplary configuration, the basic element 12a and the valve membrane 14a are connected at least in sections in the joining process 100a by means of ultrasonic welding 26a. In the present case, the ultrasonic welding 26a is ultrasonic roll seam welding 28a (cf. FIG. 6). In the case of the ultrasonic welding 26a, the basic element 12a and the valve membrane 14a are heated under the action of mechanical energy of a high-frequency sound and joined by fusing of their material. The heating is produced by the molecules which are set in motion. In the joining process 100a, at least one of the joining seams 16a, 18a is produced and/or made by pressing an ultrasonic sonotrode 82a onto an anvil 84a arranged below the ultrasonic sonotrode 82a, as viewed in the vertical direction 86a.

Since the present case involves ultrasonic roll seam welding 28a, the ultrasonic sonotrode 82a and/or the anvil 84a are/is arranged in a rolling manner and provided to carry out at least a rolling movement in at least the joining process 100a. Possibly, either the anvil 84a or the ultrasonic sonotrode 82a could be arranged in a rolling manner and/or carry out a rolling movement. In the present exemplary configuration according to FIG. 6, both the anvil 84a and the ultrasonic sonotrode 82a are arranged in a rolling manner. In the present case, the ultrasonic sonotrode 82a rotates counterclockwise while the anvil 84a rotates in the clockwise direction. The ultrasonic sonotrode 82a can therefore also be referred to as a rolling sonotrode, roll seam sonotrode and/or rotational sonotrode. As a result, a particularly efficient continuous joining process 100a can be provided and/or made possible.

Figure 7:
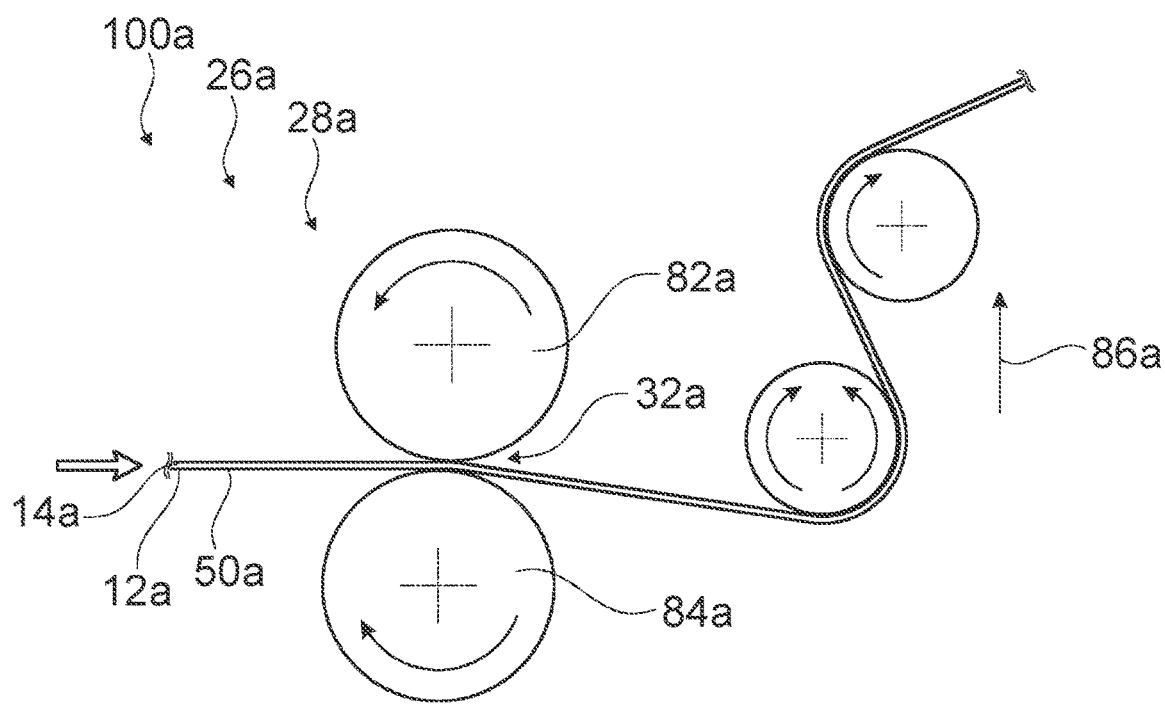
FIG. 7 shows a side view of the basic element, the valve membrane and at least the base element being guided away from a joining region after the joining process.

FIG. 7 shows the basic element 12a, the base element 50a and at least the valve membrane 14a being guided away from a joining region 32a. The joining region 32a is located between the ultrasonic sonotrode 82a and the anvil 84a (cf. FIGS. 6 and 7). The ultrasonic sonotrode 82a and the anvil 84a are merely indicated schematically in FIG. 7. The basic element 12a and at least the valve membrane 14a are guided at least substantially horizontally away from the joining region 32a after being joined. Interfering bulges and/or unevennesses of the joining seams 16a, 18a and/or of the basic element 12a and/or of the valve membrane 14a after joining can therefore be prevented.

It is apparent from FIGS. 1 to 3 that the aroma protection valve 10a comprises at least one functional element 36a. The functional element 36a in the present case is designed as a spacer strip. It would be conceivable for the aroma protection valve 10a to have further functional elements 36'a which are possibly designed differently from the functional element 36a already mentioned. In the present case, the aroma protection valve 10a has at least two functional elements 36a, 36'a which are formed identically to each other. Only the functional element 36a will be described below, with the descriptions being able to be transferred analogously to at least the further functional element 36'a.

In a further joining process 102a, the functional element 36a is connected to the valve membrane 14a on a side 38a of the valve membrane 14a that faces away from the basic element 12a. In respect of a time profile, the further joining process 102a takes place after the joining process 100a (cf. FIG. 8). The further joining process 102a could differ from the joining process 100a already mentioned. For example, in the further joining process 102a, the functional element 36a could be connected to the valve membrane 14a in an adhesively bonding manner, for example by means of an adhesive film and/or an adhesive strip, specifically could be connected to the valve membrane 14a on the side 38a of the valve membrane 14a that faces away from the basic element 12a. In the present case, the functional element 36a is connected to the valve membrane 14a by an analogous joining method as to how the valve membrane 14a is connected to the basic element 12a. In the present case, the further joining process 102a and the joining process 100a are identical in respect of their joining method. In this exemplary configuration, the functional element 36a is connected at least in sections to the valve membrane 14a in the further joining process 102a by means of ultrasonic welding 26a, specifically by means of ultrasonic roll seam welding 28a.

Figure 9:
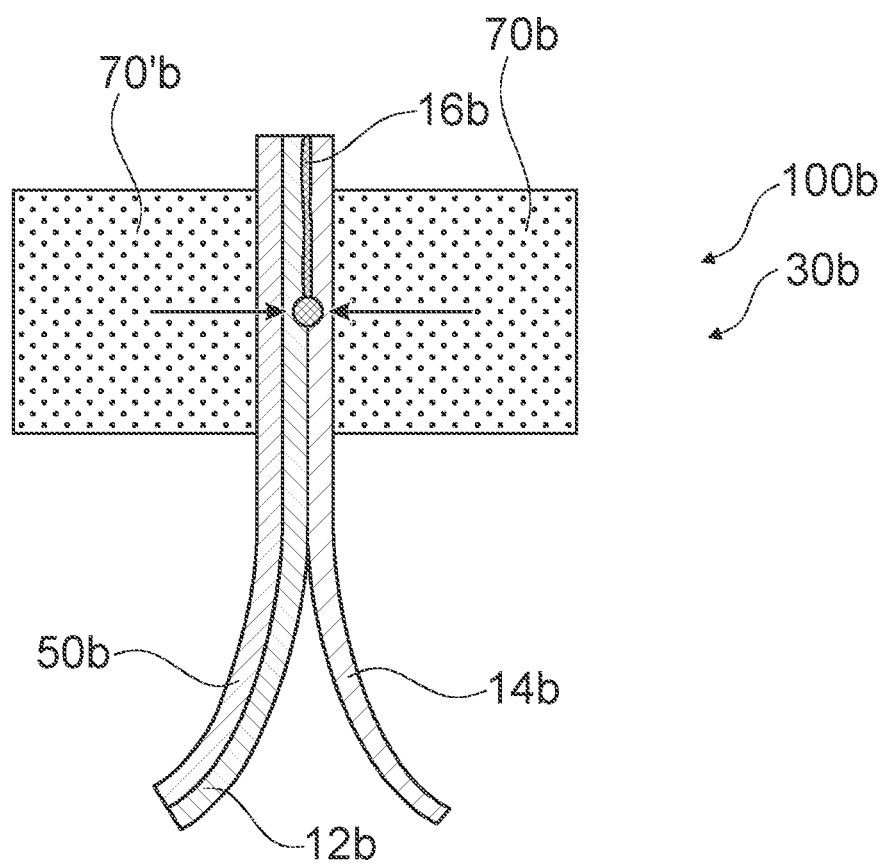
FIG. 9 shows a further design and configuration of a joining process in which a basic element and a valve membrane of an aroma protection valve are connected at least in sections by means of heat contact sealing.

FIG. 9 shows a further exemplary embodiment of the invention. The descriptions below are restricted essentially to the differences between the exemplary embodiments, with reference being able to be made in respect of components, features and functions which remain the same to the description of the exemplary embodiment of FIGS. 1 to 8. To differentiate between the exemplary embodiments, the letter a in the reference signs of the exemplary embodiment in FIGS. 1 to 8 is replaced by the letter b in the reference signs of the exemplary embodiment of FIG. 9. In respect of identically denoted components, in particular regarding components with the same reference signs, reference can basically also be made to the drawings and/or the description of the exemplary embodiment of FIGS. 1 to 8.

FIG. 9 shows a method for producing at least one aroma protection valve with a joining process 100b in an alternative configuration. In the present case, a basic element 12b and a valve membrane 14b are connected to each other at least in sections in the joining process 100b by means of heat contact sealing 30b. In the case of the heat contact sealing at least two heated sealing jaws 70b, 70'b are pressed together in the joining process 100b with a predefined pressure and/or a predefined sealing time, with the material to be sealed, specifically the basic element 12b and at least the valve membrane 14b being arranged between the sealing jaws 70b, 70'b. The heated sealing jaws 70b, 70'b are arranged on opposite sides of the basic element 12b and the valve membrane 14b and are pressed together in the joining process 100b with a contact pressure such that the basic element 12b and the valve membrane 14b are connected, specifically sealed, to each other.

The invention claimed is:

1. A method for producing at least one aroma protection valve (10a) for a packaging container, having a basic element (12a) and having a valve membrane (14a) which is connected at least in sections to the basic element (12a) in a joining process (100a) by an energy input, the basic element (12a) and the valve membrane (14a) being connected to each other without an adhesive in the joining process (100a), wherein the basic element (12a) and the valve membrane (14a) are connected at least in sections in the joining process (100a) by ultrasonic welding (26a), wherein the basic element (12a) and the valve membrane (14a) are connected to each other in the joining process (100a) on a base element (50a) which is provided for handling and/or stabilizing the basic element (12a) and/or the valve membrane (14a) during the joining process (100a).

2. The method as claimed in claim 1, wherein the basic element (12a) and the valve membrane (14a) are connected to each other in a continuous joining process (100a).

3. The method as claimed in claim 1, wherein the basic element (12a) and the valve membrane (14a) are connected to each other along at least one joining seam (16a) in the joining process (100a).

4. The method as claimed in claim 1, wherein the basic element (12a) has at least one opening (20a), and, in the joining process (100a), the basic element (12a) and the valve membrane (14a) are connected to each other along at least two joining seams (16a, 18a) on opposite sides of the opening (20a).

5. The method as claimed in claim 1, wherein the basic element (12a) and/or the valve membrane (14a) are/is heated in the joining process (100a).

6. The method as claimed in claim 1, wherein the basic element (12a) and the valve membrane (14a) are connected at least in sections in the joining process (100a) by ultrasonic roll seam welding (28a).

7. The method as claimed in claim 1, wherein a thermoplastic is at least partially used as the basic element (12a).

8. The method as claimed in claim 1, wherein the basic element (12*a*) and the valve membrane (14*a*) have at least substantially same expansion properties.

9. The method as claimed in claim 1, wherein the basic element (12*a*) and the valve membrane (14*a*) are at least partially formed from a same material.

10. The method as claimed in claim 1, wherein the basic element (12*a*) and the valve membrane (14*a*) after being joined are guided at least substantially horizontally away from a joining region (32*a*).

11. The method as claimed in claim 1, wherein the aroma protection valve (10*a*) comprises at least one functional element (36*a*) which is connected to the valve membrane (14*a*), in a further joining process (102*a*), on a side (38*a*) of the valve membrane (14*a*) that faces away from the basic element (12*a*).

12. An aroma protection valve (10*a*) for a packaging container, which is at least partially produced by a method as claimed in claim 1, wherein the basic element (12*a*) and the valve membrane (14*a*) were connected to each other in a joining process (100*a*) on a base element (50*a*), that is removable for an application process in which the aroma protection valve can be arranged on the packaging container.

\* \* \* \* \*